Sept. 30, 1952     D. W. GALLOWAY, JR     2,612,431
SURVEY RECORDER
Filed April 7, 1947     2 SHEETS—SHEET 1
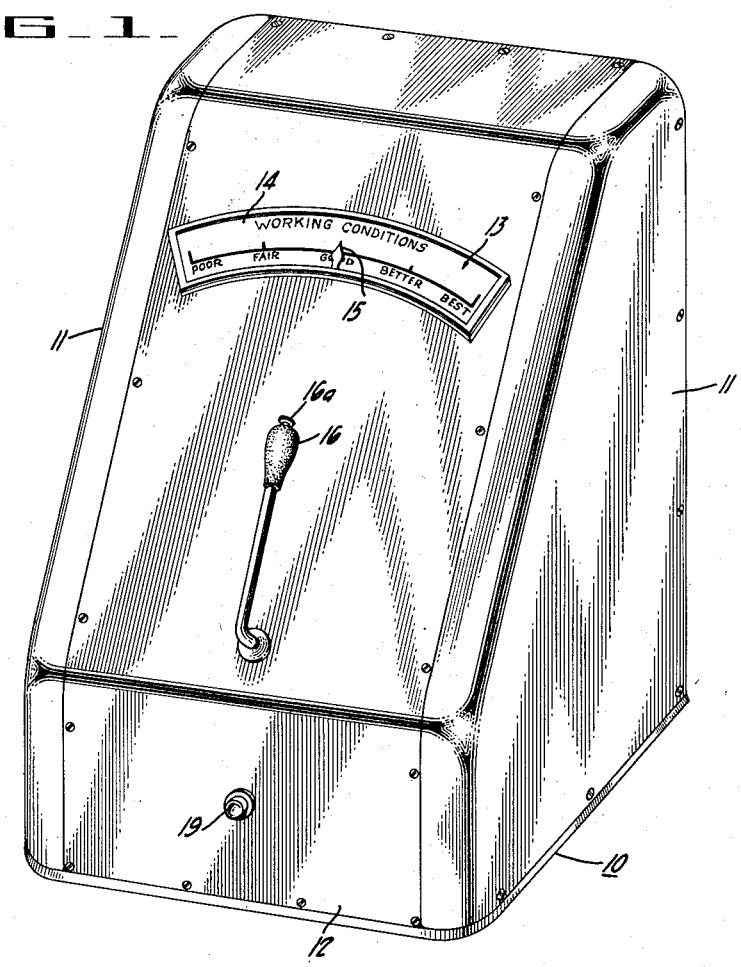
FIG_1_
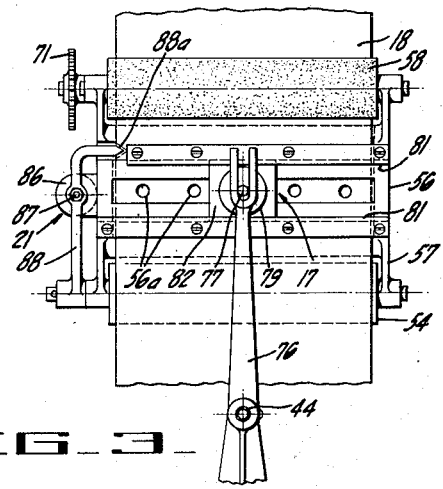
FIG_3_
INVENTOR.
David W. Galloway Jr.
BY Harper Allen Sept. 30, 1952 D. W. GALLOWAY, JR 2,612,431
SURVEY RECORDER
Filed April 7, 1947 2 SHEETS—SHEET 2
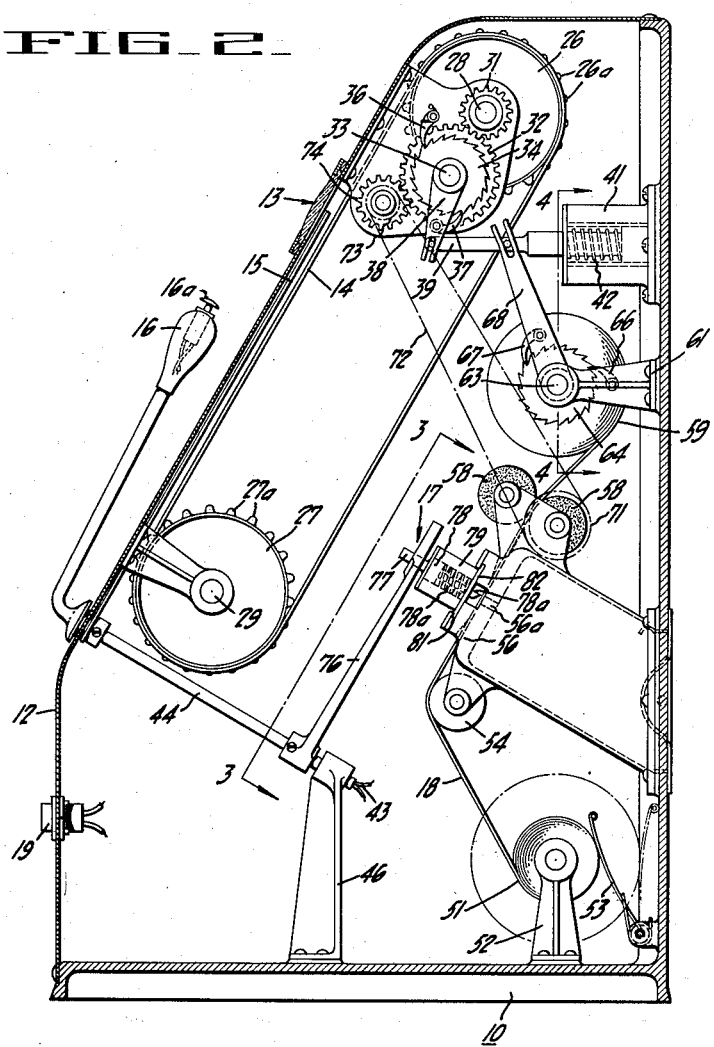
FIG_2_
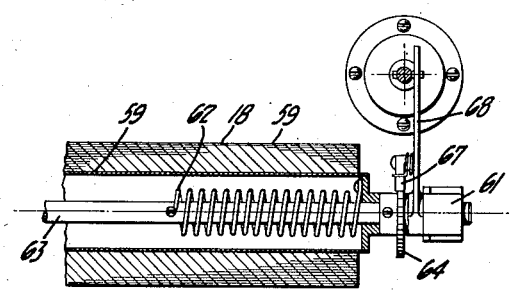
FIG_4_
INVENTOR.
David W. Galloway Jr.
BY
Harper Allen Patented Sept. 30, 1952

2,612,431

UNITED STATES PATENT OFFICE 2,612,431

SURVEY RECORDER

David W. Galloway, Jr., Berkeley, Calif.

Application April 7, 1947, Serial No. 739,935

9 Claims. (Cl. 346—33)

This invention relates to survey recorders and is concerned more particularly with the provision of a recorder of the above character in which the replies to the various questions of a questionnaire can be recorded without the necessity for a personal interview.

In the field of consumer research as at present practiced it is generally customary to supply an interviewer with the questionnaire or other data to be tested for the purpose of personal interviews with selected subjects to get their replies or choices as to the various questions or subjects for investigation. As a result, a broad survey is an expensive operation and not only requires the services of one or more personal interviewers, but also requires the actual re-recording of the replies on punch cards or other record sheets for use in automatic tabulating machines.

The present invention has for its principal object the provision of a survey recorder which is automatic in its operation in making a record and which can be operated by the person being interviewed.

A further object of the invention is to provide a survey recorder which will successively present different questions in a series to a subject, together with appropriate means for recording the answers of the subject to the various questions on a record such as a punch card or a roll.

A further object of the invention is to provide a recorder of the above character which is simple in construction and is economical in manufacture.

Another object of the invention is to provide a recorder of the above character which will enable easy, accurate recording of the answers of a subject to the various questions of a questionnaire.

Other objects and advantages of the invention will be apparent from the following description of a preferred embodiment thereof, as illustrated in the accompanying drawings, in which:

Figure 1 is is a perspective view of a survey recorder embodying the instant invention.

Figure 2 is a transverse sectional view through the recording mechanism.

Figure 3 is a fragmentary sectional view taken as indicated by the line 3—3 in Figure 2.

Figure 4 is a fragmentary sectional view taken as indicated by the line 4—4 in Figure 2.

In general the recorder includes a frame 10 forming the base and back of the recorder and a casing including similar side pieces 11 and a front piece 12. The case is provided with a sight opening 13 through which a data exhibiting means such as an endless sheet 14 can be seen. A pointer 15 is provided for association with the data sheet and an operating handle 16 is provided for moving the pointer 15 with respect thereto in a manner later described. The operating handle or selector 16 is also adapted to control a recorder 17 and its relative position with respect to a record 18. This relative position is also in part controlled from the data exhibiting means 14 so that by operation of the handle 16 and the data exhibiting means 14, the recorder 17 is located in the proper relative adjustment with respect to the record 18 to indicate the reply or choice of the subject to the question viewed through the sight opening 13. The recorder is also provided with a start button 19 for controlling a "start" recorder 21 also described in greater detail hereinafter.

From the above general description it will be seen that the subject being interviewed can control the recorder to indicate his choice of answers to the question exhibited and, as will be later described, when a choice is selected the recorder operates automatically to bring the next question on the questionnaire into the data exhibiting position ready for the indication of the next choice or answer of the subject.

Referring in greater detail to the various parts of the recorder, the data exhibiting means 14 may comprise an endless band or belt, as previously described, which is trained about respective support rolls 26 and 27 carried by respective shafts 28 and 29 on the frame of the machine. Adjacent each edge the belt 14 is provided with spaced perforations to engage respective feed teeth 26a and 27a of the rolls 26 and 27 so that the data exhibiting means or belt 14 is at all times positively controlled in its position by the feed roll 26. The feed roll 26 is driven in step by step fashion through a pinion 31 on its shaft 28 which meshes with a gear 32 suitably carried by an idler shaft 33. The shaft 33 also carries a ratchet 34 having a holding pawl 36 associated therewith and a feed pawl 37 pivoted on an operating arm 38 journalled on the shaft 33. The arm 38 is connected to the armature 39 of a solenoid 41 so that whenever the solenoid 41 is energized the armature 39 compresses the spring 42 and positions the feed pawl 37 for operative movement. Upon deenergization of the solenoid 41, the ratchet 34 will be operated by the spring 42 to advance the data exhibiting means 14 to display another question at the sight opening 13. The energization of the solenoid 41 is under the control of suitable contact means in the selector handle 16 adapted to be closed by a push button 16a slidably mounted at the upper end of the handle 16. The electrical connections 43 for this circuit extend through the handle 16 and its hollow support shaft 44 which is journalled in the front casing portion 12 and a bracket 46.

The record strip or ribbon 18 is wound upon a supply roll 51 which is journalled in suitable brackets 52 and has a spring-urged friction detent 53 engaging the roll portion of the sheet. From the roll 51 the record 18 extends over an idler roll 54, a recording support head 56 of a bracket 57, then between a pair of resilient feed rolls 58 journalled on the bracket 57 to a take-up roll 59 supported in brackets 61. The take-up roll 59 (Figure 4) is connected through a spring 62 to its support shaft 63 which carries a ratchet 64. The ratchet 64 is engaged by respective holding and actuating pawls 66 and 67. The actuating pawl 67 is carried by an arm 68 pivoted on the shaft 63 and having a slotted end engaging a suitable pin on the armature 39. Thus, each time the solenoid 41 is operated the spring 62 is partially wound to provide for take-up of any slack in the record 18.

The feeding of the record sheet 18 to align a particular record portion or row thereof on the recording head 56 to correspond to the question being exhibited through the sight opening 13 is effected through a sprocket 71 associated with one of the feed rolls 58 and connected by a chain 72 with a sprocket 73 which is driven through a pinion 74 from the gear 32 of the drive for the data exhibiting means. Thus each time the data exhibiting means is advanced to display another question, the record sheet 18 is also advanced to bring another record portion thereof into registry with the recorder. As will later appear, this step feed of the record sheet is effected after it has been perforated to indicate the "answer" selection of the subject in the previous question displayed to him.

The positioning of the handle 16 and the pointer 15 with respect to the sight opening 13 also serves to control the position of the recorder 17 with respect to the record which, in this case, is shown as the web or tape 18. For this purpose the support shaft 44 for the selector handle 16 carries a fork 76 having a slotted upper end (Figures 2 and 3) engaging a pin 77 carried by the recorder solenoid 79. The armature 78 of the solenoid carries a punch portion 78a which is adapted to be aligned with any one of a series of punch openings 56a extending in a transverse row across the recording head 56 of the bracket 57. If desired, the openings 56a may be connected to form a slot. The recording solenoid 79 is mounted for transverse sliding movement on the bracket 57 by means including opposite tracks 81 formed on the bracket and a guide or slide portion 82 of the solenoid 79.

From the above description it will be seen that positioning of the selector handle 16 and the associated pointer 15 with respect to the data exhibited through the sight opening 13 effects a corresponding transverse positioning of the recorder solenoid 79 and its punch 78a with respect to the record 18. Thus when the contact control button 16a is depressed and the solenoid 79 is energized, a perforation will be made in the record sheet indicating the response of the subject to the particular question.

In order to indicate the beginning of a series of answers on the record sheet 18, the start button 19 is provided which closes a suitable contact to energize a start solenoid 86 (Figure 3) whose armature 87 is connected to a pivoted arm 88 having a V-shaped clipper nose 88a aligned with the edge of the record sheet 18 and above a similarly formed side groove in the bracket 56.

In operation with the data exhibiting belt 14 positioned to exhibit the first question of a series the subject to be interviewed presses the start button 19 which places an indicia on the record in the form of a notch in the edge of the record sheet 18 to indicate the beginning of a set of answers to the series of questions. Then the subject adjusts the handle 16 until the pointer 15 indicates his choice of the answers. For example, as shown in Figure 1, the pointer 15 is aligned with the word "Good" with respect to a question concerning working conditions. Then the contact button 16a is depressed to simultaneously energize the recorder solenoid 79 and the feed solenoid 41. It will be recalled that by movement of the handle 16 to the proper position, in this case the central position, indicating the choice of answers, the recorder head 17 is also correspondingly positioned so that the punch 78a will be aligned centrally of the recording head 56. When the recording solenoid 79 is energized, the armature 78 is carried downward against the tension of the spring 78a to effect a perforation in the record and when the button 16a is released the punch 78a will be withdrawn. At the same time the feed solenoid 41 is energized to move its armature 39 against the spring 42 and thereby move the feed pawl 37 back over an appropriate number of teeth of the ratchet 34 and condition the feed mechanism for operation upon de-energization of the solenoid 41. When the contact button 16a is released, the spring 42 becomes effective through the armature 39 to operate the feed roll 26 and advance the data exhibiting means 14, to operate the feed rolls 58 to advance the record sheet 18, and to operate the spring winding arm 68 to provide for take-up of the used record sheet on the storage roll 59.

It will be appreciated that while a continuous tape form record sheet 18 has been selected for purposes of illustration, the invention is equally useful with the common form of punched card with an appropriate change in the type of record feeding mechanism in accordance with well-known card feeding devices. Alternatively, each card could be manually inserted through an appropriate slot in the side wall of the casing.

From the above description it will be seen that the survey recorder of this invention provides an easy method of obtaining consumer surveys without the requirement for a personal interviewer for each subject. These devices can be installed in plants for operation by the employees, in public places where the survey is directed to the general public, or in any other desired location and the individual to be interviewed performs the necessary work without requiring the services of an interviewer.

While I have shown and described a preferred embodiment of the invention, it is apparent that the invention is capable of variation and modification from the form shown so that its scope should be limited only by the scope of the claims appended hereto.

I claim:

1. A survey recorder, comprising adjustable means for exhibiting data, record holding means, recording means for placing choice indications on the record, said recording means and said record being mounted for relative adjustment, a manual selection control for selective positioning with respect to said data exhibiting means, and means controlled by said data exhibiting means for effecting relative adjustment of said record and said recording means.

2. A survey recorder, comprising means for exhibiting data, record holding means, recording means for placing choice indications on the record, said recording means and said record being mounted for relative adjustment, a manual selection control for selective positioning with respect to said data exhibiting means, and means controlled by said selection control for effecting relative adjustment of said record and said recording means in one direction, and means controlled by said data exhibiting means for effecting said relative adjustment in another direction.

3. A survey recorder, comprising means for exhibiting rows of data in sequence, choice indicating means aligned with a row of data being exhibited, record holding means including means for adjusting a record therein row-by-row under control of said data exhibiting means, recording means related to said record holding means, and means for positioning said recording means with respect to a record in said record holding means in accordance with the choice indicated by operation of said indicating means.

4. A survey recorder, comprising means for exhibiting rows of data in sequence, choice indicating means aligned with a row of data being exhibited, record holding means including means for adjusting a record therein row-by-row under control of said data exhibiting means, recording means related to said record holding means, means for positioning said recording means with respect to a record in said record holding means in accordance with the choice indicated by operation of said indicating means, a start recorder operatively related to the record, and a manually operable start control for controlling operation of said start recorder.

5. A survey recorder, comprising an endless belt for exhibiting rows of data in sequence, choice indicating means aligned with a row of data being exhibited and movable transversely thereof to any position between end limits of movement of said indicating means, record holding means including means for adjusting a record therein in synchronism with said data exhibiting belt, recording means related to said record holding means, an operation control for said recording means associated with said choice indicating means, and means for positioning said recording means with respect to a record in said record holding means in accordance with the choice indicated by operation of said indicating means.

6. A survey recorder comprising means for exhibiting rows of data in sequence with any selected number of answer choices in each row, choice indicating means aligned with the row of data being exhibited and mounted for movement along the row of data for variable positioning between end limits of movement, record holding means including means for adjusting a record therein row by row in synchronism with the row by row movement of said data exhibiting means, recording means related to said record holding means for relative movement therebetween to effect variable positioning of said recording means corresponding to the positioning of said choice indicating means, and means for effecting relative movement between said recording means and said record holding means under control of said choice indicating means and in synchronism with the adjusting movement thereof.

7. A survey recorder comprising means for exhibiting rows of data in sequence with any selected number of answer choices in each row, choice indicating means aligned with the row of data being exhibited and being movable along the row of data for variable positioning between end limits of movement, record holding means including means for adjusting a record therein row by row in synchronism with the row by row movement of said data exhibiting means, recording means related to said record holding means for relative movement therebetween to effect variable positioning of said recording means corresponding to the positioning of said choice indicating means, means for effecting relative movement between said recording means and said record holding means under control of said choice indicating means and in synchronism with the adjusting movement thereof, and means controlled by said choice indicating means for simultaneously advancing said data exhibiting means and said record so that a new row of data for answering and recording is presented to the operator only after indication of a choice with respect to the previously exhibited row of data.

8. A survey recorder comprising intermittently movable means for exhibiting various data to an operator from which a choice of a plurality of answers may be selected by said operator during each of successive periods of rest of said exhibiting means, intermittently movable record holding means for such choice answers, recording means for placing choice indications on the record on said holding means, control mechanism movable by the operator relative to said data exhibiting means for selecting the various choice answers, means connected to and movable by said control mechanism for effecting relative movement between said record and said recording means in accordance with the positioning of said control mechanism with respect to said data exhibiting means whereby said record will receive such choice indication in a predetermined position, and means automatically operable upon each period of recording of said recording means to move said exhibiting means and said record holding means to positions, respectively, where said exhibiting means presents different data to be selected and the record on said record holding means is adapted to receive the choice answer for such different data.

9. A survey recorder comprising a casing having an elongated sight opening, intermittently movable means within said casing for exhibiting rows of data on a sheet of material adapted to be moved past said opening by said movable exhibiting means and from which a choice of a plurality of answers may be selected by an operator during each of successive periods of rest of said exhibiting means, intermittently movable record holding means for supporting and intermittently moving a record adapted to receive such choice answers, recording means for placing choice indications on the said record, a manually operable control member movably mounted on said casing relative to said sight opening for selecting the various choice answers, means mounting said recording means for movement with said control member so that a recording on said record can be effected in accordance with the selected position of said control member, means manually actuatable by the operator to effect operation of said recording means, and means automatically operable upon completion of each period of operation of said recording means to move said data exhibiting means and said record holding means to positions, respectively, where said exhibiting means presents different data to be selected and the record on said record holding means is adapted to receive the choice answer for such different data.

DAVID W. GALLOWAY, Jr.

REFERENCES CITED

The following references are of record in the file of this patent:

UNITED STATES PATENTS

| Number | Name | Date |
|---|---|---|
| 592,590 | Howe | Oct. 26, 1897 |
| 1,655,510 | Runyan | Jan. 10, 1928 |
| 1,749,226 | Pressey | Mar. 4, 1930 |
| 1,929,872 | Lavery et al. | Oct. 10, 1933 |
| 2,030,175 | LeFevre | Feb. 11, 1936 |
| 2,062,453 | Hastings | Dec. 1, 1936 |
| 2,169,266 | Matter | Aug. 15, 1939 |
| 2,304,450 | Fuller | Dec. 8, 1942 |
| 2,311,055 | Kopas | Feb. 16, 1943 |